US011757812B2

(12) United States Patent
Bastide et al.

(10) Patent No.: US 11,757,812 B2
(45) Date of Patent: *Sep. 12, 2023

(54) INTERLEAVED CONVERSATION CONCEPT FLOW ENHANCEMENT

(71) Applicant: International Business Machines Corporation, Armonk, NY (US)

(72) Inventors: Paul R. Bastide, Ashland, MA (US); Fang Lu, Billerica, MA (US); Robert E. Loredo, North Miami Beach, FL (US); Matthew E. Broomhall, Goffstown, NH (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 190 days.

This patent is subject to a terminal disclaimer.

(21) Appl. No.: 17/129,908

(22) Filed: Dec. 22, 2020

(65) Prior Publication Data
US 2021/0110110 A1    Apr. 15, 2021

Related U.S. Application Data

(63) Continuation of application No. 16/547,261, filed on Aug. 21, 2019, now Pat. No. 11,301,629.

(51) Int. Cl.
*G06F 40/279* (2020.01)
*H04L 51/046* (2022.01)
(Continued)

(52) U.S. Cl.
CPC .......... *H04L 51/046* (2013.01); *G06F 18/214* (2023.01); *G06F 18/22* (2023.01);
(Continued)

(58) Field of Classification Search
CPC ............ G06F 40/216279; G06F 40/35; G06F 40/216; G06F 40/279; G06F 3/0483;
(Continued)

(56) References Cited

U.S. PATENT DOCUMENTS 5,371,673 A    12/1994  Fan
5,596,634 A     1/1997  Fernandez
(Continued)

FOREIGN PATENT DOCUMENTS

CN    102194001 A    9/2011

OTHER PUBLICATIONS

IBM: List of IBM Patents or Patent Applications Treated as Related, 2 pg.
(Continued)

*Primary Examiner* — Gerald Gauthier
(74) *Attorney, Agent, or Firm* — CUENOT, FORSYTHE & KIM, LLC

(57) ABSTRACT

Interleaved conversation concept flow enhancement can include detecting a topic of an on-going conversation over an electronic communication system. In response to detecting a topic newly introduced into the on-going conversation, a topic-divergence metric (TDM) with respect to the original topic and the newly introduced topic can be determined. A topic-divergence response action can be initiated in response to the newly introduced topic diverging from the original topic by more than a predetermined threshold based on the TDM.

7 Claims, 8 Drawing Sheets

(51) Int. Cl.
*G06N 20/00* (2019.01)
*G10L 21/06* (2013.01)
*G06F 18/22* (2023.01)
*G06F 18/214* (2023.01)

(52) U.S. Cl.
CPC ........... *G06F 40/279* (2020.01); *G06N 20/00* (2019.01); *G10L 21/06* (2013.01)

(58) Field of Classification Search
CPC .. G06F 16/355; G06F 16/9535; G06F 16/951; G06F 40/258; G06F 40/30; G06F 16/35; G06F 18/22; G06K 9/6215; G06K 9/6256; G06N 3/0454; G06N 3/084; G06N 5/022; G06N 20/00; G06N 20/10; G06Q 50/01; G06Q 10/00; G06Q 10/10; G10L 15/18; G10L 15/1822; G10L 21/06; H04L 51/046; H04L 51/52; H04L 51/216; H04L 51/066; H04L 51/10; H04M 3/56; H04M 3/5175; H04N 21/4622; H04N 21/4728; H04W 76/45; B25J 9/1694; B25J 11/001

See application file for complete search history.

(56) References Cited

U.S. PATENT DOCUMENTS

| | | | |
|---|---|---|---|
| 6,052,657 A | 4/2000 | Yamron | |
| 6,104,989 A * | 8/2000 | Kanevsky | G06F 40/216 704/7 |
| 6,259,969 B1 | 7/2001 | Tackett et al. | |
| 7,475,010 B2 | 1/2009 | Chao | |
| 7,983,902 B2 | 7/2011 | Wu | |
| 8,214,242 B2 | 7/2012 | Agapi et al. | |
| 8,301,450 B2 | 10/2012 | Lee et al. | |
| 8,375,308 B2 * | 2/2013 | Fuchs | H04M 3/56 715/755 |
| 9,269,073 B2 | 2/2016 | Sammon et al. | |
| 9,477,712 B2 | 10/2016 | Chipman | |
| 9,756,003 B2 | 9/2017 | Bastide et al. | |
| 10,548,001 B1* | 1/2020 | Shelley | H04L 51/10 |
| 10,554,931 B1 | 2/2020 | Zavesky et al. | |
| 10,885,065 B2 | 1/2021 | Dunne et al. | |
| 10,967,508 B2* | 4/2021 | Nelson | B25J 9/1694 |
| 11,018,997 B2* | 5/2021 | Scanlon | G06N 20/00 |
| 11,301,629 B2* | 4/2022 | Bastide | G06N 5/022 |
| 2005/0278613 A1 | 12/2005 | Morinaga | |
| 2006/0056440 A1* | 3/2006 | Khartabil | H04W 76/45 370/260 |
| 2007/0033040 A1* | 2/2007 | Huang | G10L 15/1822 704/254 |
| 2007/0143101 A1 | 6/2007 | Goutte | |
| 2008/0077572 A1 | 3/2008 | Boyle | |
| 2009/0055381 A1* | 2/2009 | Wu | G06F 40/258 707/999.005 |
| 2012/0233191 A1* | 9/2012 | Ramanujam | G06F 16/9535 707/E17.107 |
| 2012/0296637 A1* | 11/2012 | Smiley | G06F 40/30 704/9 |
| 2013/0080212 A1* | 3/2013 | Li | G06Q 50/01 705/7.38 |
| 2013/0273976 A1 | 10/2013 | Rao | |
| 2014/0172857 A1* | 6/2014 | Powell | G06F 16/355 707/738 |
| 2014/0218461 A1* | 8/2014 | DeLand | H04L 51/52 704/9 |
| 2014/0337308 A1* | 11/2014 | De Francisci Morales | H04N 21/4622 707/708 |
| 2015/0012270 A1 | 1/2015 | Reynolds | |
| 2015/0200879 A1* | 7/2015 | Wu | G06F 3/0483 715/758 |
| 2015/0207765 A1* | 7/2015 | Brantingham | H04L 51/046 715/758 |
| 2016/0085854 A1 | 3/2016 | Blackford et al. | |
| 2016/0164813 A1* | 6/2016 | Anderson | H04L 51/216 709/206 |
| 2016/0179786 A1 | 6/2016 | Clark | |
| 2016/0180737 A1 | 6/2016 | Clark et al. | |
| 2016/0188672 A1 | 6/2016 | Lev | |
| 2016/0285807 A1 | 9/2016 | Bastide | |
| 2016/0335325 A1 | 11/2016 | Dhara et al. | |
| 2017/0366481 A1 | 12/2017 | Sagar | |
| 2018/0013800 A1* | 1/2018 | Morrison | G06F 16/951 |
| 2018/0115877 A1* | 4/2018 | Riker | H04L 51/066 |
| 2018/0182383 A1* | 6/2018 | Kim | G06F 40/289 |
| 2018/0293607 A1* | 10/2018 | Huddleston | G06Q 50/01 |
| 2018/0324116 A1 | 11/2018 | Vaduva | |
| 2018/0356952 A1* | 12/2018 | Boothroyd | G06Q 10/10 |
| 2019/0057143 A1 | 2/2019 | Porter | |
| 2019/0068527 A1* | 2/2019 | Chen | G06Q 10/00 |
| 2019/0108270 A1 | 4/2019 | Dunne | |
| 2019/0248001 A1* | 8/2019 | Kawamura | B25J 11/001 |
| 2019/0347319 A1 | 11/2019 | Goyal | |
| 2019/0362253 A1* | 11/2019 | Francis | G06Q 50/01 |
| 2019/0377790 A1* | 12/2019 | Redmond | G06F 40/35 |
| 2020/0044996 A1 | 2/2020 | Johnson et al. | |
| 2020/0057808 A1* | 2/2020 | Dunne | H04L 51/046 |
| 2020/0097546 A1 | 3/2020 | Petri et al. | |
| 2020/0226217 A1* | 7/2020 | Anders | H04L 51/216 |
| 2020/0257758 A1 | 8/2020 | Pandit et al. | |
| 2020/0334306 A1 | 10/2020 | Baughman | |
| 2020/0335120 A1* | 10/2020 | Candelore | H04N 21/4728 |
| 2020/0351225 A1 | 11/2020 | Lenchner et al. | |
| 2020/0372466 A1 | 11/2020 | Bastide et al. | |
| 2020/0380206 A1 | 12/2020 | Hirzel et al. | |
| 2021/0029249 A1 | 1/2021 | Erhart | |
| 2021/0050002 A1* | 2/2021 | Bastide | G06F 40/279 |
| 2021/0056172 A1* | 2/2021 | Bastide | G10L 21/06 |
| 2021/0110110 A1* | 4/2021 | Bastide | G06F 40/279 |
| 2021/0258424 A1* | 8/2021 | Brown | H04M 3/5175 |
| 2022/0021724 A1 | 1/2022 | Sivakumar et al. | |
| 2022/0139385 A1* | 5/2022 | Cheng | G10L 15/18 704/9 |

OTHER PUBLICATIONS

Bastide, P.R. et al., "Interleaved Conversation Concept Flow Enhancement", U.S. Appl. No. 16/547,261, filed Aug. 21, 2019, 40 pages.

Mell, P. et al., The NIST Definition of Cloud Computing, National Institute of Standards and Technology, U.S. Dept. of Commerce, Special Publication 800-145, Sep. 2011, 7 pg.

Mikami, A.Y. et al., "Online Social Communication Patterns among Young Adult Women with Histories of Childhood Attention-Deficit/Hyperactivity Disorder," [online] Journal of Abnormal Psychology, Aug. 2015, vol. 124, No. 3, retrieved from the Internet: <https://www.ncbi.nlm.nih.gov/pmc/articles/PMC4573788/>, 24 pg.

Alderman, L., "Does Technology Cause ADHD?" [online] Everyday Health [retrieved May 28, 2019], retrieved from the Internet: <https://www.everydayhealth.com/adhd-awareness/does-technology-cause-adhd.aspx>, 4 pg.

Drago, E., "The Effect of Technology on Face-to-Face Communication," [online] The Elon Journal of Undergraduate Research in Communications, vol. 6, No. 1, Spring 2015, retrieved from the Internet: <https://www.elon.edu/docs/e-web/academics/communications/research/vol6no1/02DragoEJSpring15.pdf>, 13 pg.

Hurley, K, "ADHD & Technology: A Help or a Hindrance," [online] Remedy Health Media, LLC © 2019, Feb. 13, 2018, retrieved from the Internet: <https://www.psycom.net/adhd-and-technology>, 3 pg.

Hernandez, D. et al., "Frequent Technology Use Linked to ADHD Symptoms in Teens, Study Finds," [online] Wall Street Journal, Jul. 17, 2018, retrieved from the Internet: <https://www.wsj.com/articles/frequent-technology-use-inked-to-adhd-symptoms-in-teens-study-1531839628>, 1 pg.

"BBC—Ontologies—Core Concepts Ontology," [online] BBC © 2019, Oct. 6, 2015, retrieved from the Internet: <https://www.bbc.co.uk/ontologies/coreconcepts>, 7 pg.

(56) References Cited

OTHER PUBLICATIONS

Bastide, P.R. et al., "Interleaved Conversation Concept Flow Enhancement", U.S. Appl. No. 16/547,261, filed Aug. 21, 2019.

* cited by examiner

INTERLEAVED CONVERSATION CONCEPT FLOW ENHANCEMENT

BACKGROUND

This disclosure relates to electronic communication systems, and more particularly, to managing multi-participant conversations over an electronic communication system.

Various electronic communication systems enable multiple individuals to interact with one another remotely over a network (e.g., local area network, wide area network, Internet) for a variety of purposes. Enterprise-wide collaboration systems, for example, allow colleagues to work jointly even though located at different work sites. Social networking platforms, for example, allow individuals to share information even though physically separated from each other.

SUMMARY

In one or more embodiments, a method includes detecting a first topic of an on-going conversation over an electronic communication system. The method also can include determining a topic-divergence metric (TDM) with respect to the first topic and a second topic in response to detecting the second topic introduced into the on-going conversation. Additionally, the method can include initiating a topic-divergence response action in response to the second topic diverging from the first topic by more than a predetermined threshold based on the TDM.

In one or more embodiments, a system includes a processor configured to initiate operations. The operations can include detecting a first topic of an on-going conversation over an electronic communication system. The operations also can include determining a topic-divergence metric (TDM) with respect to the first topic and a second topic in response to detecting the second topic introduced into the on-going conversation. Additionally, the operations can include initiating a topic-divergence response action in response to the second topic diverging from the first topic by more than a predetermined threshold based on the TDM.

In one or more embodiments, a computer program product includes a computer readable storage medium having program instructions stored thereon. The program instructions are executable by a processor to initiate operations. The operations can include detecting a first topic of an on-going conversation over an electronic communication system. The operations also can include determining a topic-divergence metric (TDM) with respect to the first topic and a second topic in response to detecting the second topic introduced into the on-going conversation. Additionally, the operations can include initiating a topic-divergence response action in response to the second topic diverging from the first topic by more than a predetermined threshold based on the TDM.

This Summary section is provided merely to introduce certain concepts and not to identify any key or essential features of the claimed subject matter. Other features of the inventive arrangements will be apparent from the accompanying drawings and from the following detailed description.

BRIEF DESCRIPTION OF THE DRAWINGS

The inventive arrangements are illustrated by way of example in the accompanying drawings. The drawings, however, should not be construed to be limiting of the inventive arrangements to only the particular implementations shown. Various aspects and advantages will become apparent upon review of the following detailed description and upon reference to the drawings.

DETAILED DESCRIPTION

Figure 1:
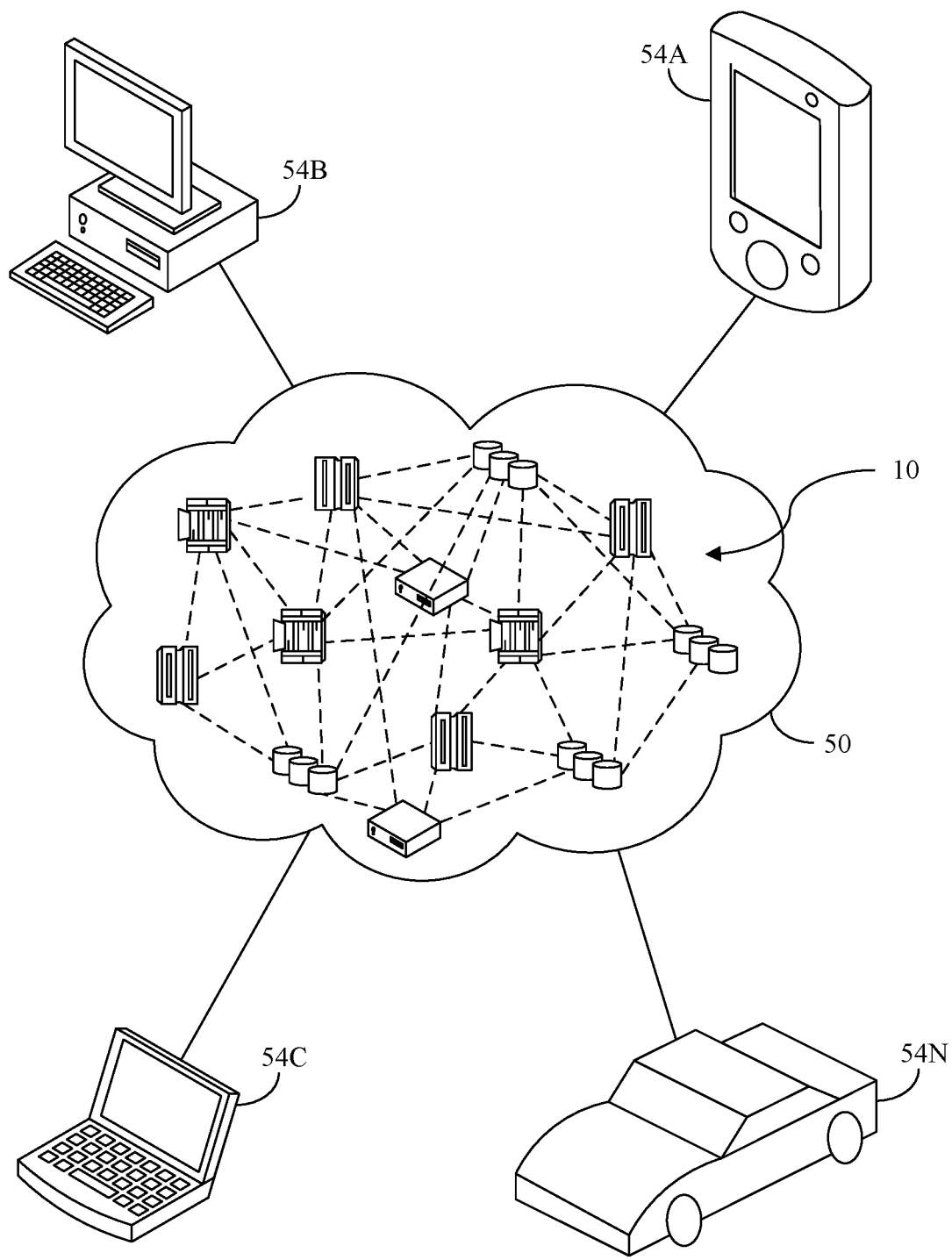
FIG. 1 depicts a cloud computing environment according to an embodiment of the present invention.

While this disclosure concludes with claims defining novel features, it is believed that the various features described within this disclosure will be better understood from a consideration of the description in conjunction with the drawings. The process(es), machine(s), manufacture(s) and any variations thereof described herein are provided for purposes of illustration. Specific structural and functional details described within this disclosure are not to be interpreted as limiting, but merely as a basis for the claims and as a representative basis for teaching one skilled in the art to variously employ the features described in virtually any appropriately detailed structure. Further, the terms and phrases used within this disclosure are not intended to be limiting, but rather to provide an understandable description of the features described.

This disclosure relates to electronic communication systems, and more particularly, to managing multi-participant conversations over an electronic communication system. Notwithstanding the convenience and efficiency of electronic communication systems there is inevitably a possibility—perhaps inherent in all human conversations—that the participants will stray from the intended object of conversation, or as often said, "get off topic." When the theme or thread of a conversation is lost, even if only briefly, the experience can be frustrating to one or more of the conversation participants. Even a participant who perhaps unintentionally, or even unwittingly, led the conversation astray may soon regret the time wasted getting the conversation "back on track." Indeed, once off track, the conversation may never get back on track.

Typically, a conversation gets off track as result of a participant introducing a new topic that deviates from the current topic of the conversation. As defined herein, "topic" is a set of terms (expressible in words) that form a concept, which can be conceived in the human mind and which centers around a coherent idea or theme. Different topics can deviate from one another in varying degrees.

Deviating from a topic of an on-going conversation, in some situations can, create more serious problems beyond conversation participants' frustration. In the context of a conversation over an enterprise-wide collaborative network, for example, deviating from the intended topic of a work-related conversation can reduce work collaborators' productivity. In the context of electronic communications, the problem affects not only users but the electronic communication systems themselves. Topic deviations affect an electronic communication system by unnecessarily wasting bandwidth and system hardware resources on unintended or unhelpful interchanges, thereby reducing the electronic communication system's overall efficiency.

In accordance with the inventive arrangements disclosed herein, the conceptual flow of a conversation is monitored, and an automatic response is generated when the conversation deviates too far off topic. The deviation of one topic relative to another is measured by a system-determined topic-deviation metric that is automatically, machine determined based on monitoring an on-going conversation. The conversation can be a real-time verbal or text-based conversation. Alternatively, the conversation can comprise a series of verbal or written exchanges that occur separately over a span of time but that are grouped logically as a single conversation.

One aspect of the embodiments disclosed herein is reducing the likelihood and mitigating the effects of a conversation (e.g., a series of messages via an electronic communication system) being drawn into extraneous discussion of unrelated topics. In another aspect, a threshold for the system-determined topic-deviation metric can be variably set, thereby enabling conversation participants to determine in advance how much divergence among topics is acceptable. An automatic, machine response results if the system-determined deviation exceeds the threshold. The response can eliminate or reduce topic deviations, thereby enhancing the flow of concepts during the conversation Relatedly, another aspect of the embodiments disclosed herein is enhanced communication system efficiency by mitigating wasteful expenditure of bandwidth and unnecessary usage of system resources occasioned by conversations that deviate from intended topics.

Further aspects of the embodiments described within this disclosure are described in greater detail with reference to the figures below. For purposes of simplicity and clarity of illustration, elements shown in the figures have not necessarily been drawn to scale. For example, the dimensions of some of the elements may be exaggerated relative to other elements for clarity. Further, where considered appropriate, reference numbers are repeated among the figures to indicate corresponding, analogous, or like features.

It is understood in advance that although this disclosure includes a detailed description on cloud computing, implementations of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
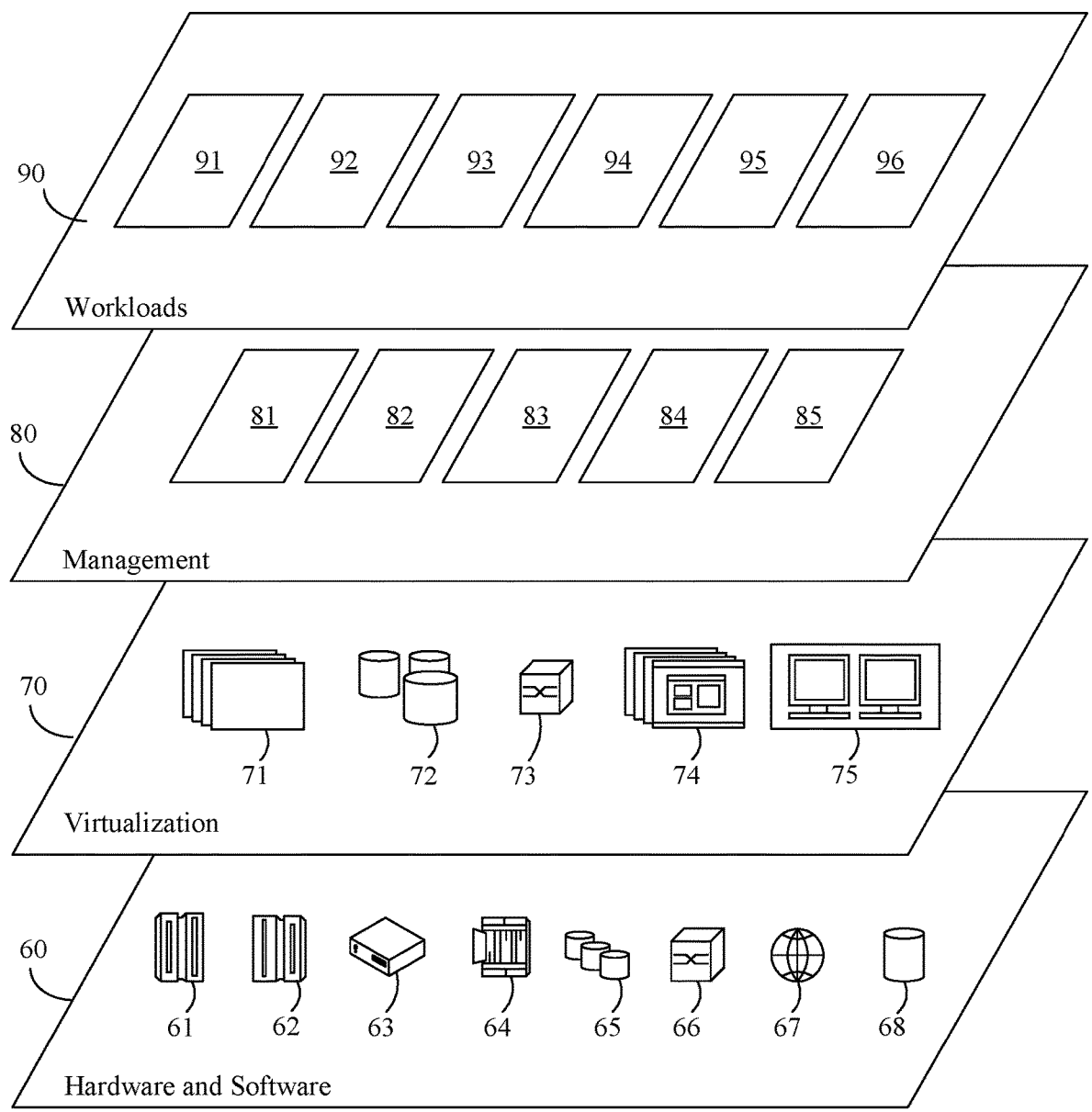
FIG. 2 depicts abstraction model layers according to an embodiment of the present invention.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture-based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA. Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and interleaved conversation concept flow enhancement 96.

In one or more embodiments, a system for interleaved conversation concept flow enhancement 96 is capable of detecting topics within an on-going conversation over an electronic communication system. As defined herein, a "topic" is a subject of, or a matter dealt within, a conversation. A "conversation," as defined herein, is a verbal interaction or written exchange of words between two or more participants. The system can detect phrases in a textual rendering of a conversation and detect topics within or associated with each phrase identified. As defined herein, a "phrase" is a word or intelligible sequence of words, whether in the form of grammatical clause, sentence or series of sentences.

The system for interleaved conversation concept flow enhancement 96, in one or more embodiments, is capable of responding to a new topic introduced into an on-going conversation by determining a topic divergence metric with respect to an original topic of the conversation and the newly introduced topic. As described more fully below, the system can use one or more different topic divergence metrics to measure how much one topic diverges from another. Each of the metrics provides a quantitative measure of the conceptual distance separating two distinct topics. If the difference is greater than a predetermined threshold, for example, the system can initiate one or more response actions. The one or more response actions can enhance the likelihood that an on-going conversation—whether a verbal or text-based conversation occurring in real time or through a series of interactions over an extended time period—remains or gets quickly back on topic. The topic divergence metric can be based on an ontology, which in certain embodiments, can be constructed using machine learning. An ontology can relate to a specific set of communication participants and/or a specific topic or set of topics. Further features of the system for interleaved conversation concept flow enhancement 96 are described below in greater detail.

Figure 3:
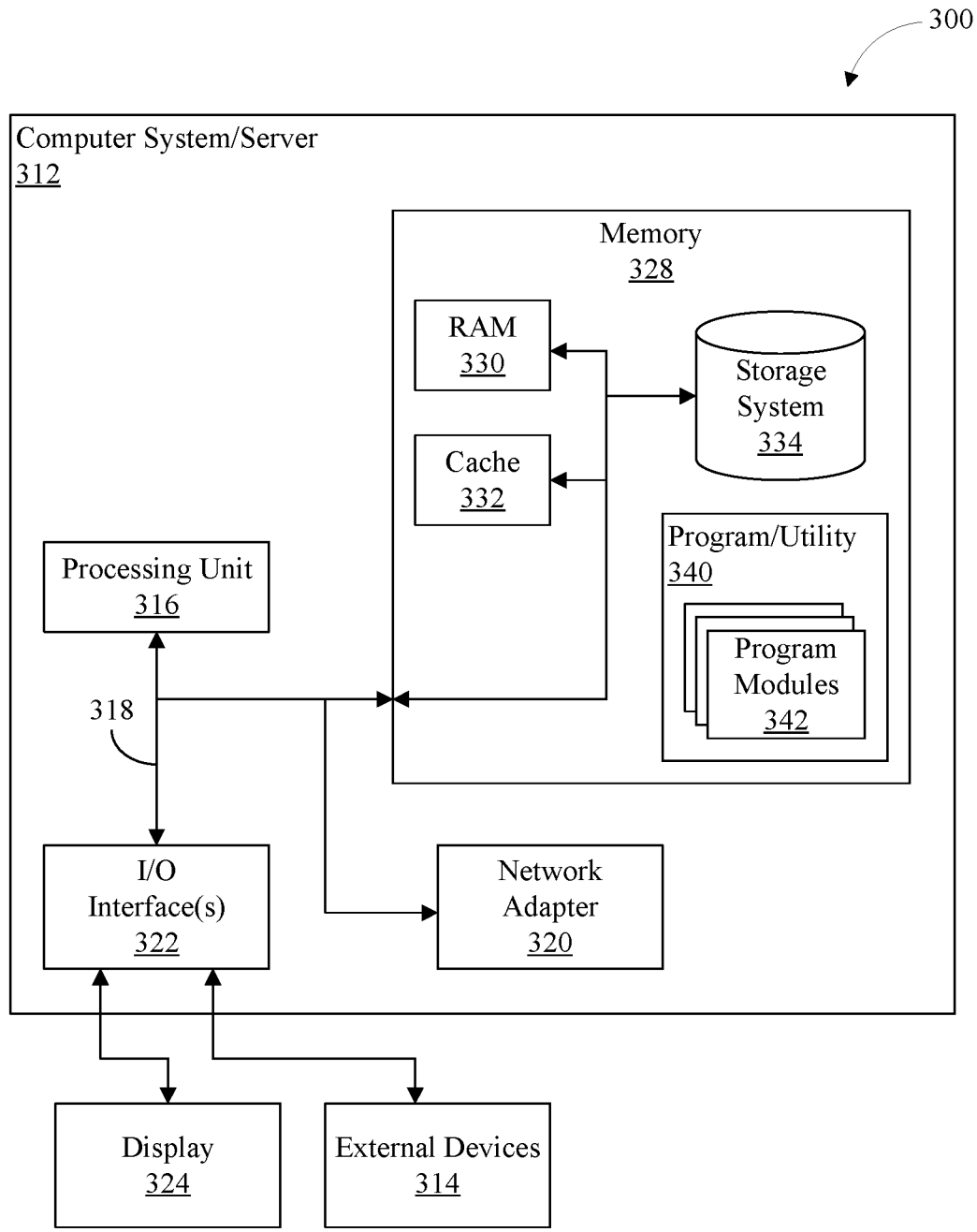
FIG. 3 depicts a cloud computing node according to an embodiment of the present invention.

FIG. 3 illustrates a schematic of an example of a computing node 300. In one or more embodiments, computing node 300 is an example of a suitable cloud computing node. Computing node 300 is not intended to suggest any limitation as to the scope of use or functionality of embodiments of the invention described herein. Computing node 300 is capable of performing any of the functionality described within this disclosure.

Computing node 300 includes a computer system 312, which is operational with numerous other general-purpose or special-purpose computing system environments or configurations. Examples of well-known computing systems, environments, and/or configurations that may be suitable for use with computer system 312 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system 312 may be described in the general context of computer system-executable instructions, such as program modules, being executed by a computer system. Generally, program modules may include routines, programs, objects, components, logic, data structures, and so on that perform particular tasks or implement particular abstract data types. Computer system 312 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 3, computer system 312 is shown in the form of a general-purpose computing device. The components of computer system 312 may include, but are not limited to, one or more processors 316, a memory 328, and a bus 318 that couples various system components including memory 328 to processor 316.

Bus 318 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, Peripheral Component Interconnect (PCI) bus, and PCI Express (PCIe) bus.

Computer system 312 typically includes a variety of computer system readable media. Such media may be any available media that is accessible by computer system 312, and may include both volatile and non-volatile media, removable and non-removable media.

Memory 328 may include computer system readable media in the form of volatile memory, such as random-access memory (RAM) 330 and/or cache memory 332. Computer system 312 may further include other removable/non-removable, volatile/non-volatile computer system storage media. By way of example, storage system 334 can be provided for reading from and writing to a non-removable, non-volatile magnetic media and/or solid-state drive(s) (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 318 by one or more data media interfaces. As will be further depicted and described below, memory 328 may include at least one program product having a set (e.g., at least one) of program modules that are configured to carry out the functions of embodiments of the invention.

Program/utility 340, having a set (at least one) of program modules 342, may be stored in memory 328 by way of example, and not limitation, as well as an operating system, one or more application programs, other program modules, and program data. Each of the operating system, one or more application programs, other program modules, and program data or some combination thereof, may include an implementation of a networking environment. Program modules 342 generally carry out the functions and/or methodologies of embodiments of the invention as described herein. For example, one or more of the program modules may include system for interleaved conversation concept flow enhancement 96 or portions thereof.

Program/utility 340 is executable by processor 316. Program/utility 340 and any data items used, generated, and/or operated upon by computer system 312 are functional data structures that impart functionality when employed by computer system 312. As defined within this disclosure, a "data structure" is a physical implementation of a data model's organization of data within a physical memory. As such, a data structure is formed of specific electrical or magnetic structural elements in a memory. A data structure imposes physical organization on the data stored in the memory as used by an application program executed using a processor.

Computer system 312 may also communicate with one or more external devices 314 such as a keyboard, a pointing device, a display 324, etc.; one or more devices that enable a user to interact with computer system 312; and/or any devices (e.g., network card, modem, etc.) that enable computer system 312 to communicate with one or more other computing devices. Such communication can occur via input/output (I/O) interfaces 322. Still yet, computer system 312 can communicate with one or more networks such as a local area network (LAN), a general wide area network (WAN), and/or a public network (e.g., the Internet) via network adapter 320. As depicted, network adapter 320 communicates with the other components of computer system 312 via bus 318. It should be understood that, although not shown, other hardware and/or software components could be used in conjunction with computer system 312. Examples, include, but are not limited to the following: microcode, device drivers, redundant processing units, external disk drive arrays, RAID systems, tape drives, and data archival storage systems, etc.

While computing node 300 is used to illustrate an example of a cloud computing node, it should be appreciated that a computer system using an architecture the same as or similar to that described in connection with FIG. 3 may be used in a non-cloud computing implementation to perform the various operations described herein. In this regard, the example embodiments described herein are not intended to be limited to a cloud computing environment. Computing node 300 is an example of a data processing system. As defined herein, the term "data processing system" means one or more hardware systems configured to process data, each hardware system including at least one processor programmed to initiate operations and memory.

Computing node 300 is an example of computer hardware. Computing node 300 may include fewer components than shown or additional components not illustrated in FIG. 3 depending upon the particular type of device and/or system that is implemented. The particular operating system and/or application(s) included may vary according to device and/or system type as may the types of I/O devices included. Further, one or more of the illustrative components may be incorporated into, or otherwise form a portion of, another component. For example, a processor may include at least some memory.

Computing node 300 is also an example of a server. As defined herein, the term "server" means a data processing system configured to share services with one or more other data processing systems. As defined herein, the term "client device" means a data processing system that requests shared services from a server, and with which a user directly interacts. Examples of a client device include, but are not limited to, a workstation, a desktop computer, a computer terminal, a mobile computer, a laptop computer, a netbook computer, a tablet computer, a smart phone, a personal digital assistant, a smart watch, smart glasses, a gaming device, a set-top box, a smart television and the like. In one or more embodiments, the various user devices described herein may be client devices. Network infrastructure, such as routers, firewalls, switches, access points and the like, are not client devices as the term "client device" is defined herein.

Figure 4:
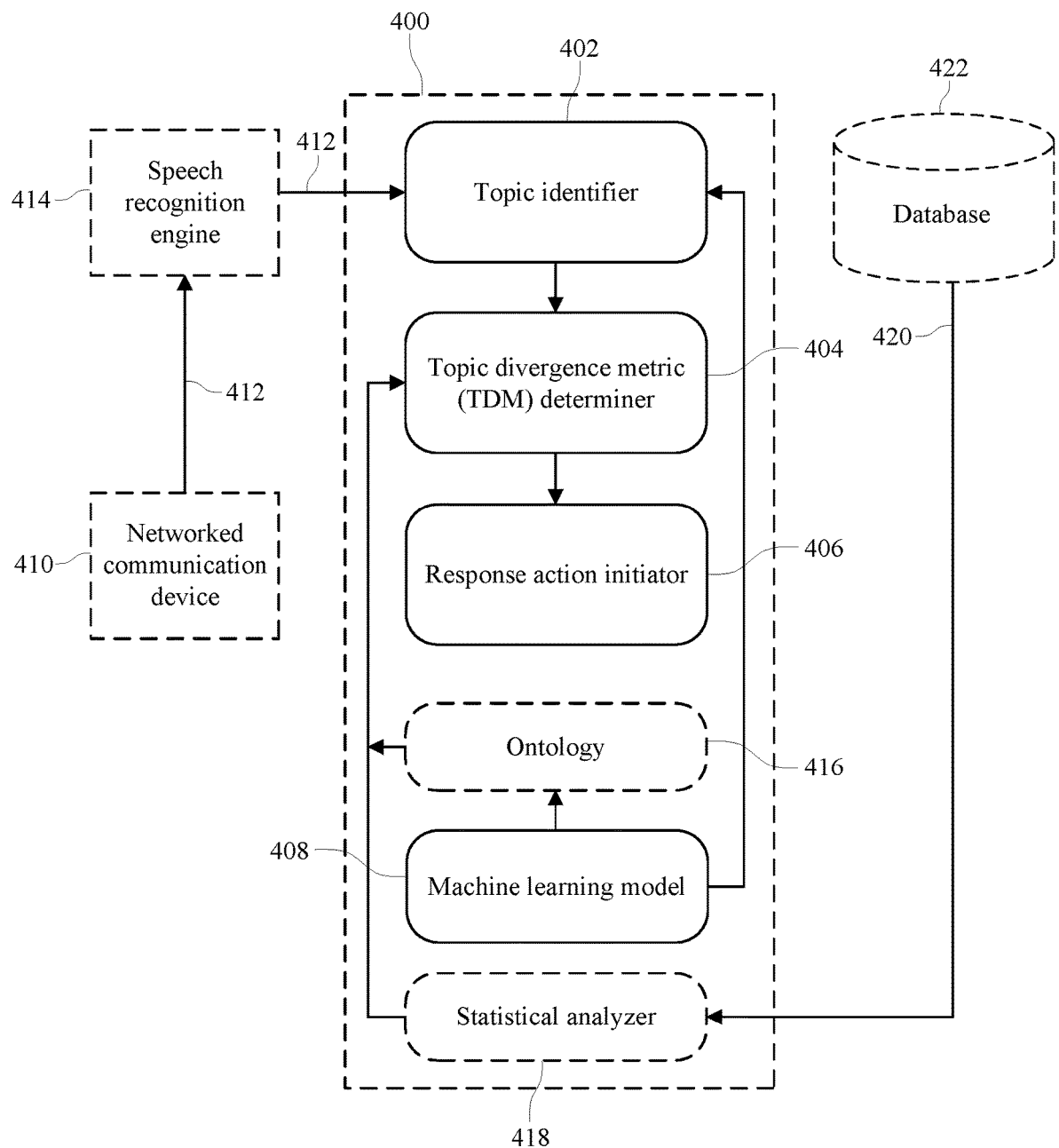
FIG. 4 depicts a system for interleaved conversation concept flow enhancement according to an embodiment of the present invention.

FIG. 4 depicts system 400, which according to one embodiment, is similar to the system for interleaved conversation concept flow enhancement 96 described in reference to FIG. 2. System 400 illustratively includes topic identifier 402, topic divergence metric (TDM) determiner 404, response action initiator 406, and machine learning model 408 operatively coupled to topic identifier 402. In one embodiment, system 400 is implemented in computer system-executable instructions (e.g., one or more program modules) that are executable by a processor such as processor 316 of computer system 312 described in reference to FIG. 3. Accordingly, system 400 can be implemented, for example, in computer-system instructions executable on a server (e.g., cloud-based server) or other type of computer system. In other embodiments, one or more of topic identifier 402, TDM determiner 404, and response action initiator 406 can be implemented in hardwired circuitry or in a combination of circuitry and computer system-executable instructions.

System 400 can be integrated in an electronic communication system, an enterprise collaboration platform, a social network, or other networked system. System 400 can be communicatively coupled with more than one such system simultaneously.

Operatively, system 400 can track a conversation flow involving multiple participants. The conversation can be a single verbal or text-based conversation or can comprise a sequence of separate messages (verbal and/or written) that are exchanged over an extended period of time. The conversation participants can conduct the conversation using one or more communication devices (only one of which, communication device 410, is explicitly shown) that are communicatively coupled to each other and system 400 via communications network 412. System 400 operates on text and, accordingly, speech recognition engine 414 can be interposed between the system and networked communication devices (illustratively including communication device 410). Communications network 412 can be implemented in, or include, one or any combination of communication technologies such as a local area network (LAN), wide area network (WAN), wireless network (e.g., wireless WAN and/or wireless LAN), mobile or cellular network, virtual private network (VPN), public switched telephone network (PSTN), or the Internet. Networked communication devices can communicatively couple to communications network 412 via wired and/or wireless communication links and can comprise computer systems (e.g., servers, personal computers, portable computers, tablets), mobile devices such as smart phones, telephones such as voice-over IP (VoIP) phones, or other types of communication device. Such devices can be used to establish audio, video, audiovisual, or other types of communication sessions through communications network 412. Non-written communications are converted to text by speech recognition engine 414, as noted above.

For a conversation (text or speech-converted text) that occurs over different networks and/or that comprises a series of separate messages exchanged over the same or different networked communication devices, system 400 logically links, or "federates," the separate messages ("federation of messages") by assigning to each message of the conversation a unique conversation identification (ID), such as the 128-bit universally unique identifier (UUID), a multipurpose Internet mail extension (MIME) formatted identifier, a check sum (e.g., SHA1/MD5), or other unique ID. The time of each message belonging to a federation of messages can be noted and logged electronically, such that the federation of messages corresponding to a conversation can be arranged by system 400 as a time series of messages.

Topic identifier 402 initially determines a topic of an on-going conversation monitored by system 400. Topic determiner 402 classifies conversations, including separate messages and conversation elements (e.g., sentences, phrases, and individual words), into one of N categories that each correspond to a predetermined topic. Topic identifier 402 can be implemented using machine learning model 408 (operatively coupled to topic identifier 402) and natural language processing (NLP) techniques to classify text (including textual renderings of verbal conversations) into categories. In various embodiments, machine learning model 408 can be trained using unsupervised and/or supervised machine learning applied to training examples of conversations. In one embodiment, topic identifier 402 can evaluate conversations against multiple support vector machines (SVMs) and classify the conversations using deep learning (e.g., convolutional neural networks).

Figure 5:
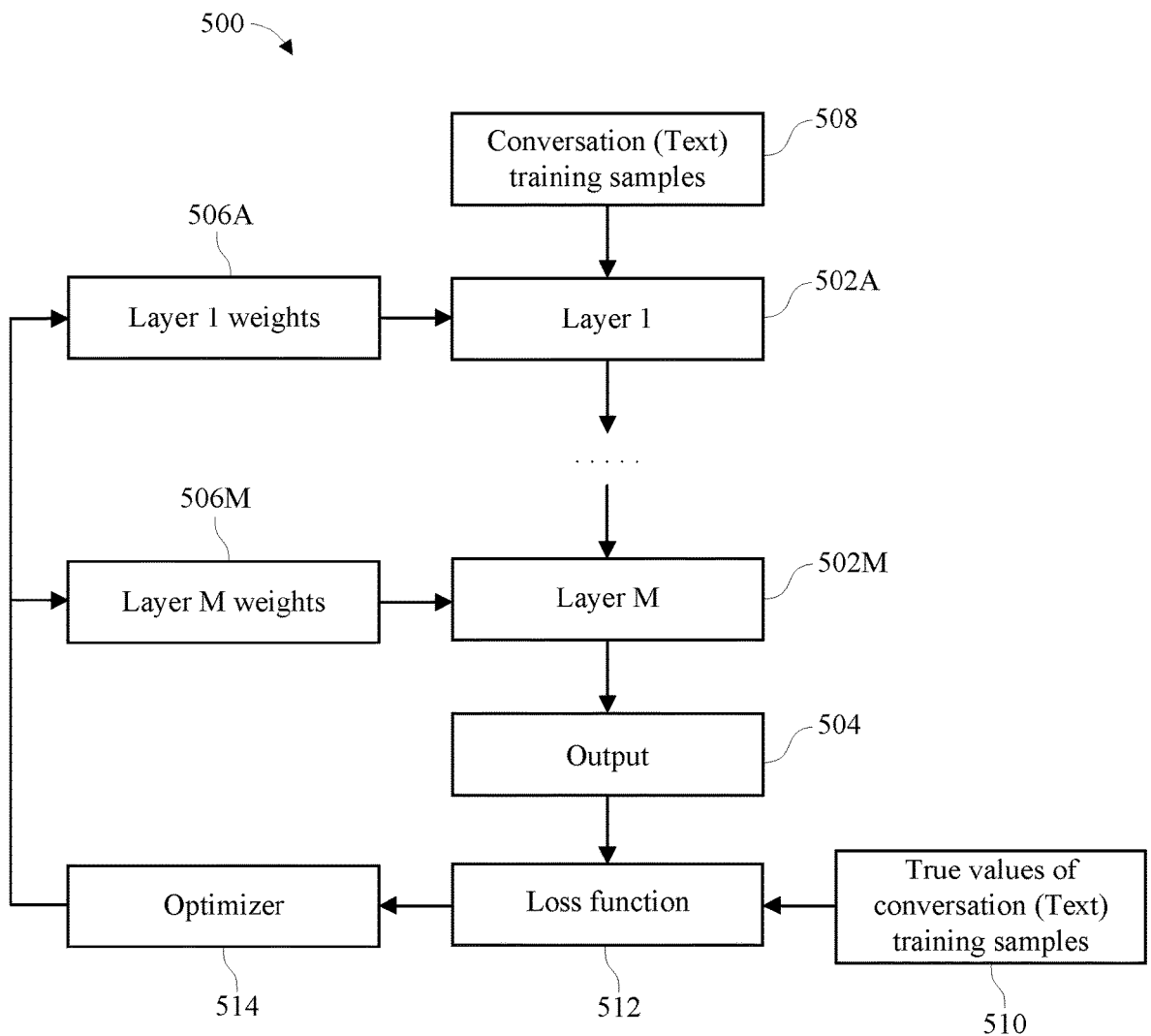
FIG. 5 depicts a deep learning neural network used in a system for interleaved conversation concept flow enhancement according to an embodiment of the present invention.

Referring additionally to FIG. 5, neural network 500 illustrates an example of a machine learning model comprising a neural network for determining on-going conversation topics. Neural network 500 is illustratively a deep learning neural network comprising a directed, acyclic graph of layers (text processing modules or filters) 502A through 502M sequentially chained together. Output 504 generated by neural network 500 is based on input that feeds through layers 502A through 502M, each layer modifying the output of a preceding layer based on a set of parameters or weights 506A through 506M. The weights (kernel and bias attributes) are trained (iteratively refined) using training samples of conversations (text) 508 fed into the neural network. The output generated is compared with true values (topic classifications) 510 of the training samples of conversations (text) 508. The difference between the generated values and true values (topic classifications) 510 for classifying the training samples of conversations (text) 508 can be measured by a loss, which is calculated by loss function 512. In one embodiment, loss function 512 is the categorical cross-entropy criterion. In a feedback fashion, optimizer 514 adjusts weights 506A through 506M over successive iterations using the backpropagation algorithm. The backpropagation algorithm iteratively adjusts weights 506A through 506M in directions that lower the loss calculated by loss function 512. The iterative refinement of weights 506A through 506M continues until an acceptable level of accuracy is achieved in classifying a separate test set of conversations (text).

Input to neural network 500, initially in the form of text (including textual renderings of verbal conversations), is transformed into numerical tensors (multidimensional algebraic objects analogous to one-dimensional vectors) by breaking the text (e.g., words, characters, n-grams) into tokens and associating numeric vectors with each. A technique such as categorical encoding (one-hot encoding) or word embedding can be used to transform text into numerical tensors. For each text so transformed, neural network 500 outputs an N-tuple, each of whose elements is a probability (between zero and one) that the conversation embodied in the text belongs to the corresponding one of the N categories. The conversation (text) is classified as belonging to the topic category for which the probability is greatest. Responsive to classifying newly presented text corresponding to a current conversation, neural network 500 determines the current topic of conversation. As a conversation proceeds, new text is generated and neural network 500 can determine from the generated text whether a new topic is introduced into the current conversation.

Referring still to FIG. 4, system 400 can continue monitoring an on-going conversation after the topic of the conversation is initially identified. Responsive to topic identifier 402 detecting an additional topic, newly introduced into the on-going conversation, TDM determiner 404 determines a TDM with respect to the initially identified topic and the newly introduced topic. Topics can be identified by an association of topics with specific words, phrases, or sentences (e.g., an association of a topic with n-gram or the subject noun of a sentence). The TDM is a measure of dissimilarity—or conversely, similarity—between topics. The TDM can be based on a conceptual "closeness of" or "distance between" topics. The distance between topics can be defined by an ontology or topological mapping of topics. For example, the TDM can be based on a partially ordered set of topics represented as a directed acyclic graph, the nodes corresponding to topics, the edges to relations between topics, and the shortest path (number of edges) between two nodes measuring the distance between the topics represented by the respective nodes. Illustratively, system 400 optionally includes ontology 416 operatively coupled to TDM determiner 404.

Figure 6:
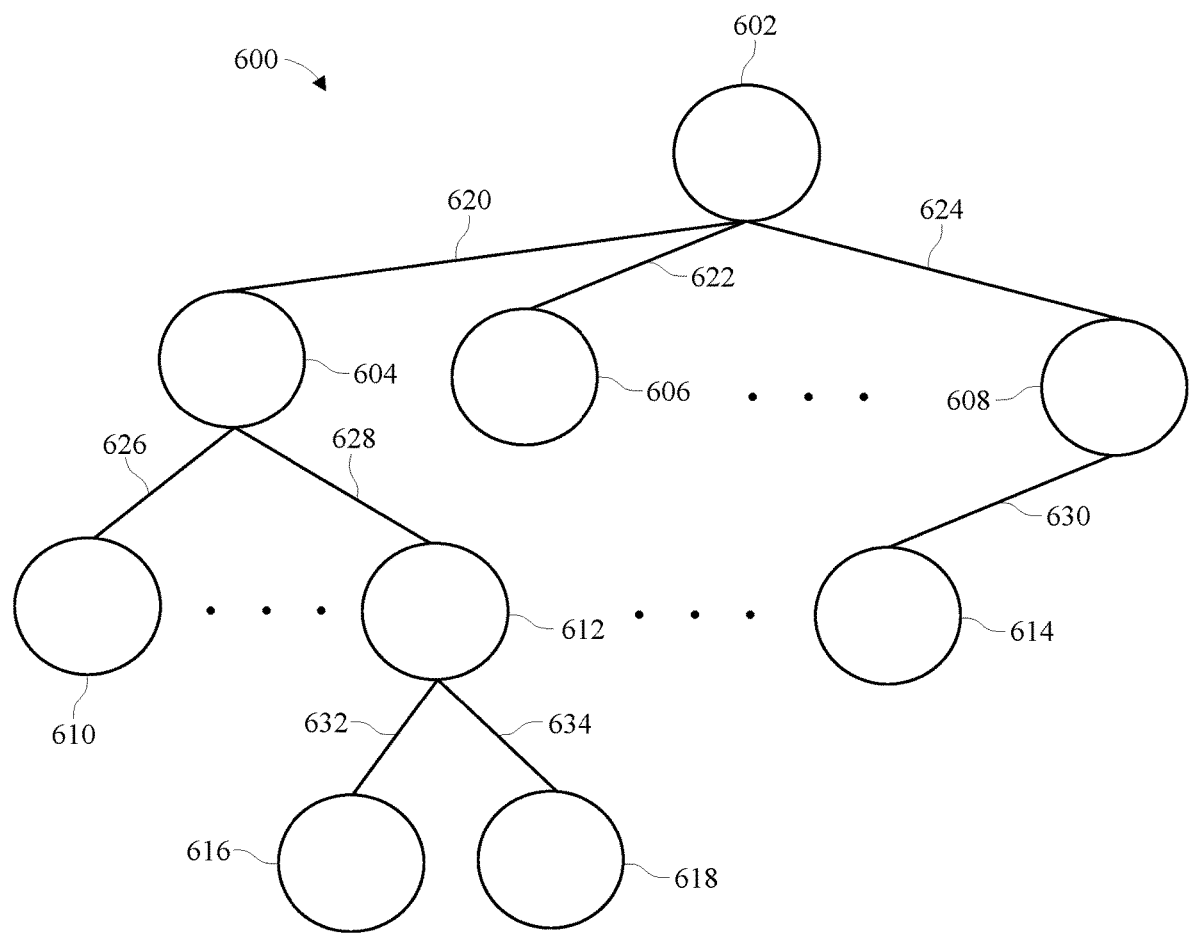
FIG. 6 depicts a generic node-edge graph of an ontology used in a system for interleaved conversation concept flow enhancement according to an embodiment of the present invention.

Referring additionally now to FIG. 6, graph 600 depicts a representative graph of an ontology comprising topic nodes 602, 604, 606, 608, 610, 612, 616, and 618 whose relationships are shown by edges 620, 622, 624, 626, 628, 630, and 634. The TDM with respect to topic 614 and 616, for example, is five, since five is the number of edges (630, 624, 620, 628, and 632) traversed along the shortest path between the topics. Ontologies can correspond to specific topics and/or specific sets of individuals (chat group, collaboration group). A domain ontology, for example, pertains to concepts belonging to a specific field (e.g., computer science) and comprises domain-specific definitions of terms (e.g., algorithm, software). A group-specific ontology, such as a collaboration group ontology, for example, can comprise specific terms relevant to work the group collaborates on. A chat group ontology, for example, can comprise specific terms relevant to topics discussed (e.g., sports) by the chat group. Ontologies can be manually created. Ontologies also can be created using machine learning. Accordingly, in FIG. 4, machine learning model 408 is operatively coupled to ontology 416 as well as topic identifier 402 and can be used in creating and refining the ontology. In one embodiment, ontology 416 is created using boot-strapping method that comprises manually creating an initial version of the ontology and using semi-supervised machine learning to subsequently expand the ontology. Ontology 416 can be further refined, for example, through unsupervised machine learning.

Figure 7:
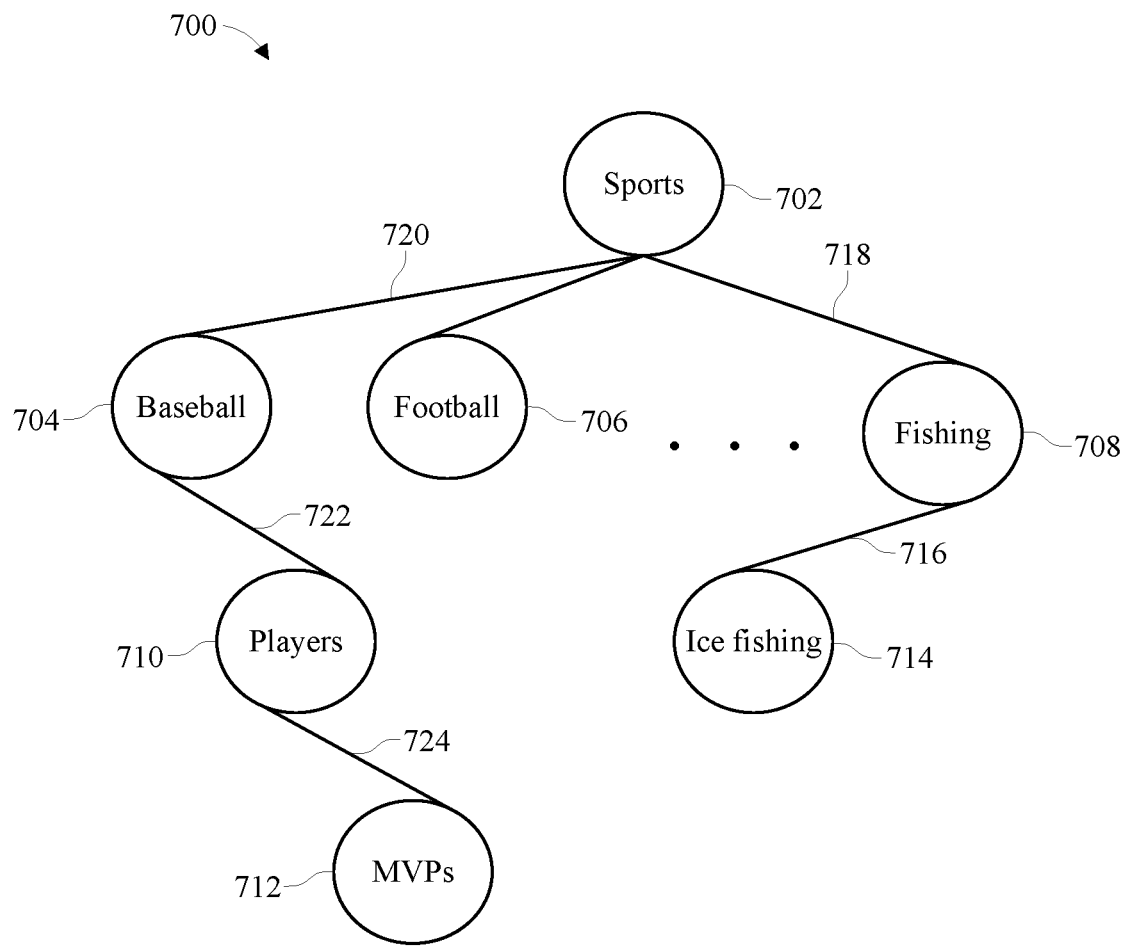
FIG. 7 depicts a node-edge graph of an example chat group ontology used in a system for interleaved conversation concept flow enhancement according to an embodiment of the present invention.

Referring additionally now to FIG. 7, graph 700 illustrates an ontology that is topic specific (sports) and is built based on samples of prior conversations of a specific group whose members chat (e.g., using a set of social media tools) about certain sports topics 702. The ontological sports topics illustratively include baseball 704, football 706, and fishing 708. Related to baseball is the topic baseball players 710, which is related to the topic players who have been or may be named most valuable players (MVPs) 712. A topic related to fishing 708 is the topic ice fishing 714. The use of the ontology by TDM determiner 404 can be illustrated by the following scenario, in which members of a sports chat group—Alice, Bob, Charlie, and Doug—engage in a conversation that occurs as a series of chat messages. System 400 observes the flow of the conversation and, based on recognizing a commonality of topic, groups (or federates) the separate messages according to a unique identifier ("conversation id").

The conversation begins with Alice discussing a specific player winning the MVP Award and asking the opinion of Bob, Charlie, and Doug. Topic identifier 402 identifies topic MVPs 712 and links the topic to messages marked by the conversation id, identifying those messages determined to relate to topic MVPs 712. At a point in the conversation, Doug submits a message expressing a desire to build an ice fishing shack. Topic identifier 402 identifies topic ice fishing 714 and links the topic to other messages marked by the conversation id. In general, with any conversation that comprises multiple messages (identified by a unique conversation id), system 400 optionally can tag each specific message in which each topic is discussed. Thus, a message in which a new topic is introduced into the conversation, as well as each subsequent message in which the topic is discussed, is identifiable based on the topic tag. Each topic of the conversation thus can be correlated with a specific message or messages of the conversation that relate to the particular topic. Messages also can each be time stamped, and system 400 optionally can correlate the time and message in which each topic is introduced and later appears in a conversation. Accordingly, in the context of Alice, Bob, Charlie, and Doug's sports chat group, the specific message (if the conversation comprises multiple messages) that Doug introduces ice fishing can optionally be tagged and the time of introduction can optionally be recorded.

Alternatively, or additionally, system 400 can include a timer that is initiated in response to the detecting introduction of a new topic into an on-going conversation. As described more fully below, the timer can time how long it takes to tie the newly introduced topic to an earlier topic of conversation or initiate a response action if the newly introduced topic is not linked to the earlier topic of conversation within a predetermined time period.

TDM determiner 404 responds to topic identifier 404 identifying a new topic introduced into an on-going conversation. Thus, in the context of Alice, Bob, Charlie, and Doug's sports chat group, TDM determiner 404, in response to topic identifier 402 detecting the newly introduced topic ice fishing 714, determines a TDM with respect to topics MVPs 712 and ice fishing 714. Basing the TDM on the number of edges (716, 718, 720, 722, and 724) traversed along the shortest path between topic MVPs 712 and topic ice fishing 714, TDM determiner 404 determines that the TDM is five.

Alternatively, or additionally, topic relatedness can be determined statistically. Accordingly, referring still to FIG. 4, system 400 optionally can include statistical analyzer 418 operatively coupled to TDM determiner 404 for generating statistical models based on prior conversations. Optionally, system 400 also can include or connect via communications network 420 to one or more databases 422 that electronically store the prior conversations (text or textual renderings of verbal conversations). A strength of association or relatedness of one topic to another topic can be measured by a statistical correlation based on the co-occurrence of identified topics within a sample of the prior conversations. For example, if based on a sample of ten prior conversations, the topic MVPs occurs three times while the topic ice fishing occurs once, then treating introduction of these topics in any sports discussion as independent events, a statistical likelihood of the co-occurrence is three percent. The likelihood of a co-occurrence can be used as TDM by TDM determiner 404 to determine topic relatedness, such that the lower the likelihood, the greater the divergence of a newly introduced topic from that of the current topic of an on-going conversation. In other embodiments, statistical analyzer 418 can comprise other statistical techniques for determining a statistically based TDM.

Operatively, the TDM determined by TDM determiner 402—whether based on an ontological distance, a statistically determined association between topics, or other metric—is provided to response action initiator 406. The TDM is a measure of the extent to which two topics diverge conceptually, and accordingly, a threshold indicating a greater-than-acceptable divergence between topics can be predetermined. The threshold can vary according to the degree of divergence that conversation participants deem acceptable. Thus, for example, the higher the threshold, the greater the participants' tolerance for topic divergence before an automatic response is initiated by response action initiator 406 in responding to a divergence greater than the predetermined threshold based on the TDM.

The TDM threshold can comprise a high value or a low value, depending on the particular definition of divergence adopted. For example, with respect to an ontologically based threshold, the TDM can be the number of edges of a node-edge graph that are traversed along the shortest path between two topics. The TDM threshold can be a maximum number of edges, which if exceeded, indicates an unacceptable divergence between topics. For example, in the above scenario described with reference to FIG. 7, if the threshold is a maximum four edges, then the introduction of the topic of ice fishing is too great a divergence since the determined TDM is five. If instead, a statistically based threshold is used, a minimum probability of co-occurrence of topics can provide the threshold. For example, with respect to the same scenario, the statistical probability of a co-occurrence of ice fishing and MVPs was three percent. If the threshold were at least five percent probability of co-occurrence, then, again, the divergence measured by the TDM (three percent) is too great a divergence. In general, an unacceptable topic divergence is one that is greater than a predetermined threshold based on the TDM, whether the TDM threshold is a relatively high value (maximum) or low value (minimum). In another aspect, a reformulation may be used to convert the threshold from a minimum value to a maximum or maximum value to a minimum. For example, the minimum five percent probability of co-occurrence threshold can be converted to a maximum threshold by redefining the TDM to be one minus the probability of co-occurrence. The equivalent threshold is thus one minus five percent (95 percent) and the calculated TDM (97 percent) is greater than the threshold—too great a divergence under the alternative minimum threshold definition.

Response action initiator 406 initiates a topic-divergence response action in response to a newly introduced topic diverging from an original topic by more than a predetermined threshold, based on the TDM determined by TDM determiner 404. A topic-divergence response action initiated by response action initiator 406, in one embodiment, can be a warning issued by one or more of the electronic communication devices used by the conversation participants. Response action initiator 406 can direct the warning to a recognized host or designated lead of the conversation, to the participant that introduced the diverging topic, or to each or a designated group of the conversation participants. For example, in the above-described sports chat group scenario that began with Alice asking for Bob, Charlie, and Doug's opinion about a baseball player's earning the MVP Award, Doug's raising the topic of ice fishing generated an above-threshold TDM. Response action initiator 406 can respond with a warning to Doug that the newly introduced topic is too great a divergence. Optionally, response action initiator 406 can advise Doug to conceptually link ice fishing to the MVP Award or take some other action to enhance the concept flow of the on-going conversation.

Response action initiator 406 can time the warning to issue only after a certain time that allows a participant to link the diverging topic to the original topic. In one embodiment, the time can vary according to the degree to which the newly introduced topic diverges from the original topic. Which, in turn, can be a function of the degree of divergence the participants find acceptable given the particular TDM threshold the participants set. A function of the degree of divergence is any rule capable of quantifying a distance between a pair of topics. As described above, distance can be quantified, for example, by the number of edges traversed along the path between two topics of a node-edge graph representing an ontology or by the statistical probability of a conversational co-occurrence of the topics. The greater the TDM-indicated divergence, the longer the time permitted for tying topics together on the assumption that the greater the divergence, the more difficult tying topics together may be. Alternatively, the greater the TDM-indicated divergence, the shorter the time permitted for tying topics together, on the assumption that the greater the divergence, the greater the need to tie disparate topics to one another quickly. One or more users (e.g., recognized host or designated lead of the conversation) of system 400 can be afforded the ability to vary the timing of the warning.

As described above, system 400 optionally can include a timer to determine whether a newly introduced topic is linked to an earlier topic of conversation within a predetermined time period. In one embodiment, system 400 can determine whether and when two topics have been successfully linked. For example, system 400 can determine that the separate topics are both discussed within a predetermined period of time, which can indicate a linkage of the two topics. Alternatively, the system 400 can monitor for certain phrases (e.g., based on analysis of prior conversations) that indicate a linkage, such as "glad you brought that topic up" or "it would seem that topic relates to the other topic that's been under discussion." In another embodiment, a specific conversation participant (e.g., designated lead or individual responsible for introducing a topic) can be relied on to respond affirmatively within a predetermined time to a warning advising a participant to link two topics. For example, in the above-described sports chat group scenario, Doug may be responsible for responding to the warning that ice fishing is too great a divergence by affirming that ice fishing has been conceptually linked to discussion of the MVP Award. The affirmation can be conveyed to system 400 via a separate message. Whenever, system 400 determines that no action has been taken or an attempt made to maintain the concept flow of the on-going conversation, response action initiator 406 can issue an additional warning. Optionally, the longer two disparate topics remain unlinked, response action initiator 406 can accelerate the pace with which system 400 issues the warnings.

In another embodiment, response action initiator 406 can provide a concept linkage hint. As defined herein, "concept linkage hint" is a word or phrase that relates, at least tangentially, based on a statistical analysis of prior conversations and/or an ontology to two distinct topics. An ontological concept linkage hint can be based on the path between the topics in a node-edge graph, and different concept linkage hints can be provided in a sequence, each of the different concept linkage hints corresponding to a topic (node) on the node-edge graph's path between two distinct topics. Response action initiator 406 can provide the concept linkage, for example, by presenting the topics corresponding to the nodes on the path individually and sequentially. In still another embodiment, response action initiator 406 can use a display of a conversation participant's electronic communication device to display in as single image the complete path between the topics, with each topic indicated by a corresponding node.

In yet another embodiment, response action initiator 406 can provide additional or alternative concept linkage hints, including linking words, phrases, expressions, or sentences. A series of word-topics corresponding to each node can be provided sequentially. In the context of the sports chat group scenario described above in reference to FIG. 7, for example, response action initiator 406 can provide Doug (who introduced the topic ice fishing into a conversation about baseball MVPs) a sequence of concept linkage hints that track the path formed by edges 716, 718, 720, 722, and 724 that link topics ice fishing 714 and MVPs 712 on a node-edge graph of a sports ontology. The first three concept linkage hints in the sequence link ice fishing 714 to fishing 708 (generally), and fishing to sports 702. If presented with the concept linkage hints, Doug is still unable to conceptually link ice fishing to MVPs, then response action initiator 406 can present the next sequential links linking sports 702 to baseball 704, and, in turn, baseball to players 710. For example, the hint may link baseball players to fishing (e.g., based on past conversations) by detecting a past conversation about players who find that relaxing during the off-season by fishing improves the players' game. The final link in the sequence generated by response action initiator 406 is to link players 710 to MVPs 712, which may link players who enjoy fishing and who also have won MVP Awards, prompting Doug to ask, "I wonder whether any of these players enjoy ice fishing?," thereby tying the topics together.

In yet another embodiment involving a specific group of conversation participants, system 400 can maintain a record of participants that cause a conversation to diverge by introducing diverging topics. The record can indicate the degree to which the topics diverged. The degree of divergence, for example, can be measured by a TDM based on the number of separating edges between two topics or statistical probability of co-occurrence of two topics. The system 400 can alert the group participants, or select members of the group, whenever the record indicates that the number of times one or more of participants have caused the conversation to diverge exceeds a predetermined threshold.

Figure 8:
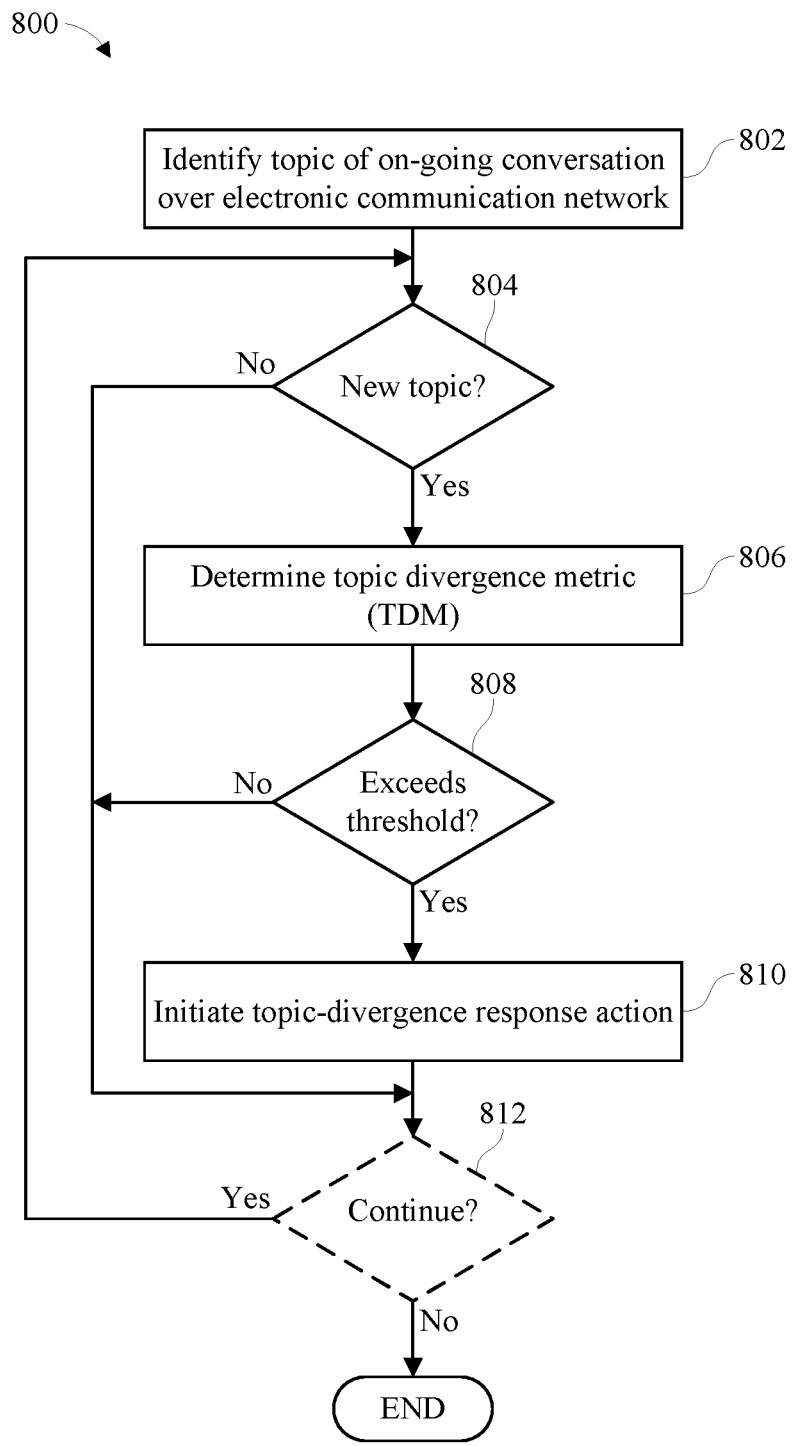
FIG. 8 depicts a method of interleaved conversation concept flow enhancement according to an embodiment of the present invention.

FIG. 8 is a flowchart of method 800 of interleaved conversation concept flow enhancement, according to one embodiment. Method 800 can be performed by a system the same as or similar to the systems described in reference to FIGS. 1-7. The system can detect a first topic of an on-going conversation over an electronic communication system at block 802. The system can monitor the on-going conversation. If at decision block 804, the system identifies a second topic that is newly introduced into the on-going conversation, then the system can determine a TDM with respect to the first topic and the second topic at block 806. If at decision block 808, the system determines that the second topic diverges from the first topic by more than a predetermined threshold, based on the TDM, then at block 810 the system can initiate a topic-divergence response action. Optionally, the system can further monitor for the introduction of additional topics if at decision block 812 the system determines that the conversation is still on-going.

The TDM determined at block 806 can be based on a statistical analysis of prior conversations. For example, the TDM can be based on a statistical probability of a co-occurrence of the topics.

The TDM determined at block 806 can be based on a predetermined ontology. The predetermined ontology, in one embodiment, can be a learned ontology generated by a machine learning model. The machine learning mode can be trained using supervised learning, semi-supervised learning, and/or unsupervised learning. The machine learning model can be trained using training data comprising data that is characteristically similar with respect to a set of topics (e.g., sports). The machine learning model can be trained using training data comprising data that is characteristically similar with respect to a set of prior conversation participants (e.g., a chat group).

A topic-divergence response action initiated at block 810 in response the second topic diverging from the first topic by more than a predetermined threshold can comprise the issuance of an electronic communication system message indicating a need to link the second topic to the first topic. The warning can be issued to a recognized host or designated lead of the on-going conversation, to the particular participant that introduced the second topic, or to each of a designated group of the conversation participants.

In one embodiment, the warning can issue in response to a participant in the on-going conversation failing to conceptually link the second topic to the first topic within a predetermined time period. The time period can be selected to allow the participant to link the second topic to the first topic. In another embodiment, the time can vary according to the degree to which the second topic diverges from the first topic, the degree of divergence measured, for example, by the number of ontological graph edges separating the two topics, the statistical probability of co-occurrence of the two topics, or a different metric.

In still another embodiment, the topic-divergence response action initiated at block 810 in response the second topic diverging from the first topic by more than a predetermined threshold can comprise conveying a conceptual link between the second topic and the first topic. The conceptual link can be based on a statistical analysis of prior conversations and/or an ontology. An ontological-based concept linkage hint can be based on the path between the topics in a node-edge graph. Different concept linkage hints can be provided in a sequence, each of the different concept linkage hints corresponding to a topic (node) on the node-edge graph's path between the topics.

The terminology used herein is for the purpose of describing particular embodiments only and is not intended to be limiting. Notwithstanding, several definitions that apply throughout this document now will be presented.

As defined herein, the terms "at least one," "one or more," and "and/or," are open-ended expressions that are both conjunctive and disjunctive in operation unless explicitly stated otherwise. For example, each of the expressions "at least one of A, B and C," "at least one of A, B, or C," "one or more of A, B, and C," "one or more of A, B, or C," and "A, B, and/or C" means A alone, B alone, C alone, A and B together, A and C together, B and C together, or A, B and C together.

As defined herein, the term "automatically" means without human interaction or intervention.

As defined herein, the terms "includes," "including," "comprises," and/or "comprising," specify the presence of stated features, integers, steps, operations, elements, and/or components, but do not preclude the presence or addition of one or more other features, integers, steps, operations, elements, components, and/or groups thereof.

As defined herein, the terms "if," "when," and "upon" mean "in response to" or "responsive to," depending upon the context. Thus, for example, the phrases "if it is determined" and "if [a stated condition or event] is detected" are to be construed to mean "in response to determining" or "responsive to determining" and "in response to detecting [the stated condition or event]" or "responsive to detecting [the stated condition or event]," depending on the context.

As defined herein, the terms "one embodiment," "an embodiment," "in one or more embodiments," "in particular embodiments," or similar language mean that a particular feature, structure, or characteristic described in connection with the embodiment is included in at least one embodiment described within this disclosure. Thus, appearances of the aforementioned phrases and/or similar language throughout this disclosure may, but do not necessarily, all refer to the same embodiment.

As defined herein, the term "output" means storing in physical memory elements, e.g., devices, writing to display or other peripheral output device, sending or transmitting to another system, exporting, or the like.

As defined herein, the term "processor" means at least one hardware circuit configured to carry out instructions. The instructions may be contained in program instructions. The hardware circuit may be an integrated circuit. Examples of a processor include, but are not limited to, a central processing unit (CPU), an array processor, a vector processor, a digital signal processor (DSP), a field-programmable gate array (FPGA), a programmable logic array (PLA), an application specific integrated circuit (ASIC), programmable logic circuitry, and a controller.

As defined herein, the term "real time" means a level of processing responsiveness that a user or system senses as sufficiently immediate for a particular process or determination to be made, or that enables the processor to keep up with some external process.

As defined herein, the phrases "responsive to" and "in response to" mean responding or reacting readily to an action or event. Thus, if a second action is performed "responsive to" or "in response to" a first action, there is a causal relationship between an occurrence of the first action and an occurrence of the second action. The phrases "responsive to" and "in response to" indicates the causal relationship.

The term "substantially" means that the recited characteristic, parameter, or value need not be achieved exactly, but that deviations or variations, including for example, tolerances, measurement error, measurement accuracy limitations, and other factors known to those of skill in the art, may occur in amounts that do not preclude the effect the characteristic was intended to provide.

As defined herein, the terms "individual," participant," "colleague," "collaborator," and "user" mean a human being. Accordingly, "individuals," "participants," "colleagues," "collaborators," and "users" mean multiple human beings.

The terms first, second, etc. may be used herein to describe various elements. These elements should not be limited by these terms, as these terms are only used to distinguish one element from another unless stated otherwise or the context clearly indicates otherwise.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions. The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "includes," "including," "comprises," and/or "comprising," when used in this disclosure, specify the presence of stated features, integers, steps, operations, elements, and/or components, but do not preclude the presence or addition of one or more other features, integers, steps, operations, elements, components, and/or groups thereof.

The descriptions of the various embodiments of the present invention have been presented for purposes of illustration and are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method, comprising:
   detecting, with computer hardware, a first topic of an on-going conversation over an electronic communication system;
   responsive to detecting, with the computer hardware, a second topic that is introduced into the on-going conversation, determining a topic-divergence metric (TDM) with respect to the first topic and the second topic; and
   initiating, with the computer hardware, a topic-divergence response action in response to the second topic diverging from the first topic by more than a predetermined threshold based on the TDM.

2. The method of claim 1, wherein
   the TDM is based on a predetermined ontology.

3. The method of claim 2, wherein
   the predetermined ontology is a learned ontology generated by a machine learning model.

4. The method of claim 3, wherein
   the machine learning model is trained using training data comprising data that is characteristically similar with respect to a set of topics or a set of prior conversation participants.

5. The method of claim 1, wherein
   the topic-divergence response action comprises issuing with the computer hardware a message indicating a need to link the second topic to the first topic.

6. The method of claim 5, wherein
   the message is timed to issue in response to a participant in the on-going conversation failing to conceptually link the second topic to the first topic within a predetermined time period.

7. The method of claim 1, wherein
   the topic-divergence response action comprises issuing with the computer hardware a message conveying a conceptual link between the second topic and the first topic.

* * * * *